(12) United States Patent
Gaentgen

(10) Patent No.: US 6,545,635 B2
(45) Date of Patent: Apr. 8, 2003

(54) SCALABLE RADAR SIGNAL PROCESSING SYSTEM

(75) Inventor: Ralph Gaentgen, Oepfingen (DE)

(73) Assignee: EADS Deutschland GmbH, Munich (DE)

(*) Notice: Subject to any disclaimer, the term of this patent is extended or adjusted under 35 U.S.C. 154(b) by 0 days.

(21) Appl. No.: 09/972,197

(22) Filed: Oct. 9, 2001

(65) Prior Publication Data

US 2002/0089444 A1 Jul. 11, 2002

(30) Foreign Application Priority Data

Oct. 9, 2000 (DE) .......................... 100 50 304

(51) Int. Cl.$^7$ .......................... G01S 13/02; G01S 13/00
(52) U.S. Cl. .......................... 342/195; 342/52; 342/58; 342/175
(58) Field of Search ................. 342/175–197, 342/25, 126, 159, 380, 52, 58; 700/4, 5; 706/10; 712/10; 702/123, 124, 125, 126, 182, 186

(56) References Cited

U.S. PATENT DOCUMENTS

| | | | | |
|---|---|---|---|---|
| 4,575,724 A | * | 3/1986 | Wiener | 342/380 |
| 4,876,651 A | * | 10/1989 | Dawson et al. | 342/179 |
| 5,386,370 A | * | 1/1995 | Woo | 342/126 |
| 5,499,195 A | * | 3/1996 | Castelaz | 342/159 |
| 5,933,794 A | * | 8/1999 | Stalzer | 702/123 |
| 6,018,306 A | * | 1/2000 | Serbin | 342/175 |

* cited by examiner

Primary Examiner—Bernarr E. Gregory
(74) Attorney, Agent, or Firm—Crowell & Moring LLP

(57) ABSTRACT

A scalable radar signal processing system for processing data between a data source and a receiving terminal, in which a bus system is connected in parallel on at least one DSP (Digital Signal Processor) node, to a corresponding number of standard DSP cards as well as components for user data delivery and for user data collection. Each DSP node is operated with the same software and all the signal processing algorithms are executed on a user data component assigned to the corresponding node.

5 Claims, 2 Drawing Sheets

SCALABLE RADAR SIGNAL PROCESSING SYSTEM

BACKGROUND AND SUMMARY OF THE INVENTION

This application claims the priority of German patent document 100 50 304.7, filed Oct. 9, 2000, the disclosure of which is expressly incorporated by reference herein.

The invention is directed to a scalable radar signal processing system for processing data between a data source and a receiving terminal.

Heretofore, the development of a radar signal processing system was extremely costly, since use of products in multiple applications was possible only rarely, and then only to a very limited extent. Also, until now the use of commercial, universally applicable digital-signal processor (DSP) cards could not eliminate the development of project-specific, non-universally applicable components, since the available DSPs required complicated system architectures because of their still low computing power. The expense in the field of software development could also not be reduced.

One object of the present invention is to create a radar signal processing system, which consists to the greatest possible extent of commercially available series components.

Another object of the invention is to provide a radar signal processing system which is adaptable to different types of hardware and software, with less expense.

Still another object of the invention is to provide a system that is as simple as possible for developing and testing the corresponding software with a justifiable expenditure also for small device support.

These and other objects and advantages are achieved by the scalable radar signal processing system for processing data between a data source and a receiving terminal according to the invention, in which a bus system is connected in parallel on at least one DSP (=Digital Signal Processor) node, to a corresponding number of standard DSP cards as well as components for user data delivery and for user data collection. Each DSP node is operated with the same software and all the signal processing algorithms are executed on a user data component assigned to the corresponding node.

Other objects, advantages and novel features of the present invention will become apparent from the following detailed description of the invention when considered in conjunction with the accompanying drawings.

DETAILED DESCRIPTION OF THE DRAWINGS

Figure 1:
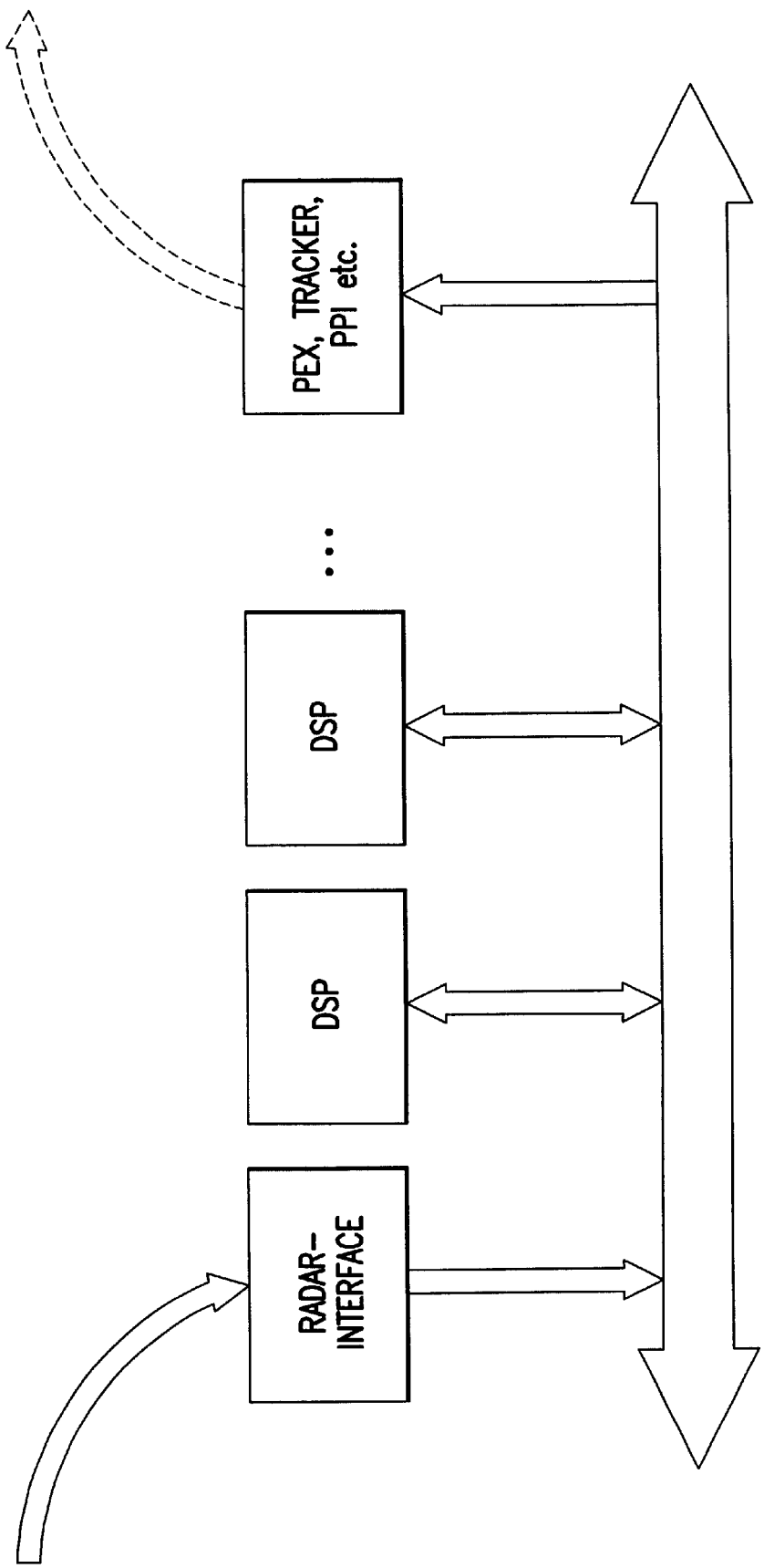
FIG. 1 is a schematic depiction of an arrangement according to the invention.

Until now, in newly initiated projects, the provision of an appropriate signal processor, as a rule, required high development cost, or, at least further development expense of not inconsiderable orders of magnitude. Also, because of economy measures, previous concepts based on DSP's ultimately require an additional development effort to make them applicable for other projects.

In the field of hardware development, costs can be reduced by using universally adaptable COTS ("Commercial Off-The-Shelf") products of bulk markets such as, for example, in telecommunications. However, the demanding requirements of radar signal processing have until now lead, as mentioned, to project-specific architectures, which generally can be used only to a limited extent in other projects.

The expenditure for system software development generally represents the predominant component of overall development cost. Alternate hardware architectures and DSP platforms, as well as the persistent need for new technology generation require in each new project considerable programming effort, even though the basic algorithms (pulse compression, double filtering, CFAR (Constant False Alarm Rate) et al) remain essentially identical. Project-specific implementation of the software makes its applicability more difficult, since necessary additional modifications and improvements always presuppose knowledge of the entire software. Such knowledge, however, of the totality of the different implementations can only reside to the fullest extent with the original developer.

Furthermore, before the actual implementation of the software, the algorithms and the corresponding parameters must first be simulated, and adapted to the conditions of the particular project. As a rule, such a simulation corresponds structurally and functionally to the actual system software itself. Nevertheless, specific portions of the software must actually be coded twice, since the simulation and system software run on different platforms and languages (for example, "MatLab" and "C").

The signal processor architecture for which digital signal processors should serve as basic components, consists mainly of two main components: "data transfer" and "data processing." The architecture should be configured to correspond with the presented task on different DSP hardware platforms, independently of the technology, DSP type, and board type being used. Altogether, a degree of independence from the card manufacturer should be achieved. The DSP cards should also be obtainable as COTS products on the free market, to eliminate the necessity of special development costs. This means that only those elements which are found on the majority of DSP cards available on the market may be used as main components; that is, standardized bus systems and DSP nodes without manufacturer-specific further development.

To be able to construct systems of a desired efficiency with this architecture, the number of DSPs (which ultimately determines the efficiency of the system) can be variable. The easiest way to realize this objective is to provide a system in which each DSP is considered as having equal access in the system, so that it is assigned the same priority. With such equal access to all DSPs, all nodes are in connection as equal-access subscribers with the (eventually virtual) bus system, which is alone responsible for the transfer of the user data. It follows from this proposition that the connections to the radar head, as well as to the subsequent processing steps, are provided via this bus system.

Such equal access of the processors also necessitates the transfer of the same task, and therefore (necessarily in a radar signal processor) the processing of all the contained algorithms, in each DSP, which is a departure from the current practice. The increased requirement for computation time must therefore be compensated by several processors.

A tool for automatic software creation must take into consideration several properties of the desired system software. These are, above all, the architecture of the target system as well as the coding language and its scope.

Due to the requirement of scalability, each DSP must be able to process all the algorithms. As a consequence, identical software can run on all DSPs, and the automatic software generation can be limited to the system software of a single processor. Also no architectural specifications need be taken into account.

Furthermore, in software generation with a tool which should be suitable for target systems of different manufacturers, no manufacturer-specific target code particularities (such as, for example, operating systems or library functions, which exceed an absolutely necessary minimum measure) are taken into consideration. While the support packages (called software development kits, tool boxes, or board support packages) for carrying out elementary functions such as initialization or communication, which are supplied by the manufacturers in similar form, can be used, they must then however be modified manually by porting to another DSP card family.

The foregoing requirements lead ultimately to a system in which a variable number of DSP cards and components for user data delivery and user data collection are connected in parallel via a data bus. Each DSP node runs software which executes all the signal processing algorithms on a user data component assigned to the node.

FIG. 1 shows an overview of the parallel architecture of a system according to the invention. The implementation of such an architecture requires a suitable bus system, at least one and preferably several DSP nodes, a user data source, and a receiving terminal.

An exemplary embodiment of the invention is described hereinafter.

As a suitable bus system the widely distributed PCI (Peripheral Components Interconnect) bus was selected, which has transfer rates of up to 33 Mwords/s×32 bit or 133 Mbytes/s. The components for this bus system have been easy to obtain on the market since its introduction into standard PCs, and individual developments which are eventually necessary can be carried out with more ease with the chip sets available on the market. Furthermore; the PCI standard offers the expandable compact PCI (cPCI), which has suitable mechanic properties (more robust plug connectors, dual Europa format) together with the same electric properties for radar signal processors.

The DSP node or nodes should include (aside from their availability to the PCI bus) a DSP of the actual generation. As an exemplary embodiment, the TMS320C6701 of Texas Instruments was selected, a floating point signal processor, which has been available in bulk since 1999. The used Daytona67 type DSP card manufactured by Spectrum offers two processor nodes with a TMS320C6701 with 167 MHz, 2 Mbytes+128 Kbytes memory and local PCI bus, which also supplies a PMC (PCI Mezzainine Connector) module plug-in location on a PC plug-in card. Other features of the card should not be used in view of the generic architecture which is to be realized therewith.

Figure 2:
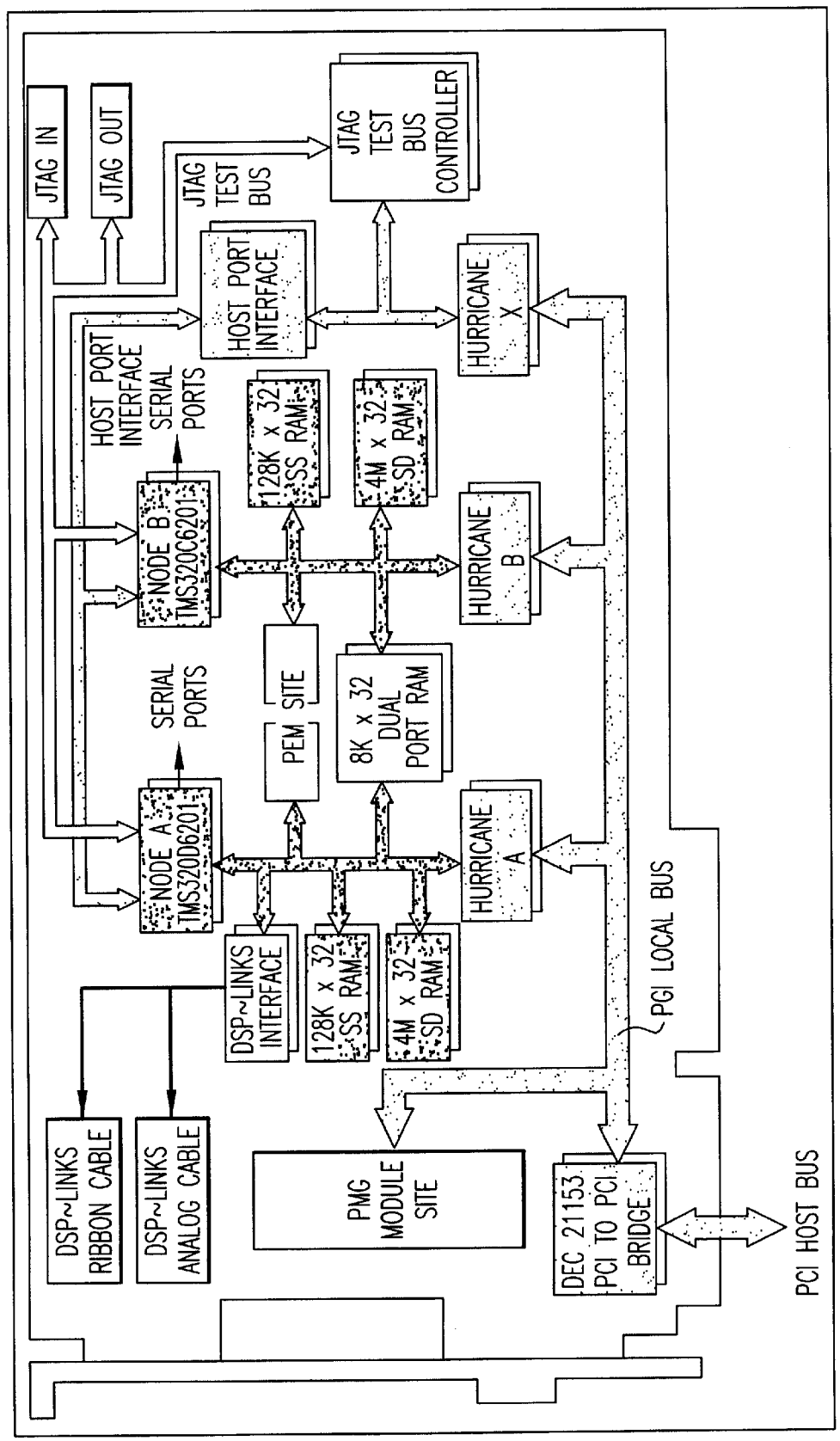
FIG. 2 is a schematic illustration of the parts used in a commercially available component according to the invention.

FIG. 2 shows a block circuit diagram of this DSP card as well as correspondingly marked used components, namely the bus system and the DSP nodes. (More specific data as to the cards to be used can be found in Daytona Dual 'C6x PCI Board—Technical Reference, Doc. No. 500-00383, Rev. 2.00, Spectrum Signal Processing Inc., May 1999.) Since as already explained, each DSP on the card must process the same algorithms, the incoming user data must be distributed to the different DSPs. In the case of the MTI (Moving Target Indicator) Modkit, a distribution into burst packages is offered, since therein all the algorithms can be processed within a burst. A processing over several bursts takes place merely at the ground clutter board with strong wind loading changes. This special case need not be considered here, especially since suitable algorithmic countermeasures are possible.

The necessary arbitration mechanism relies on the principle of distributing data packages—here bursts—in sequence to the available DSPs. With identical package sizes and sufficient number of DSPs, a DSP obtains new data only when it has processed its previous package. This assumption is possible since the processing duration in most used algorithms is determined and constant.

To process the algorithms, first the complete data of a radar burst, and then the status word (which signals the concluded data transfer), are transmitted to the DSP nodes. When the result data are available, the DSP, in turn, sets a status word, which signalizes its readiness to deliver data and to receive new data.

A complete processing cycle of a single DSP node runs also in the following way:
transmission of a data package from the data source to the DSP node;
setting of the input status word;
computation of the result data;
setting of the output status word;
transmission of the result data to the receiving terminal.

All available DSP nodes process this cycle in canon-like nested form so that the obtained result data are available in the same time sequence, and the load on the communication bus is approximately constant.

The following modifications of the shown arbitration mechanism are possible and were also tested in the main features:

A DSP node receives several bursts in a data transfer procedure; this leads to less overhead, but higher latency time.

The use of differently sized packages with different resulting computation time is practical in the application case of a multimode radar; but it requires an additional transfer of processing parameters and an expanded arbitration mechanism as well as "reserve DSPs."

An increased number of DSP cards provides corresponding redundancy, which is in part desirable for specific applications.

The used PC, into which the DSP card was incorporated (also called "host" hereinafter) takes over, in addition to the control tasks already mentioned, the simulation of the data source and the receiving terminal. These tasks are converted to the host software in Microsoft Developer Studio with Visual C and auxiliary functions of the Daytona WinNt Host Software Development Kit of Spectrum according to Daytona/Barcelona 'C6x PCI Board—Windows NT Programming Guide, Doc. No. 500-00384, Rev. 1.10, Spectrum Signal Processing Inc., May 1999.

The following actions are carried out by the software:
Simulated radar data computation;
Initialization of the DSP subsystem and the communication between host and DSP node,
Loading of DSP node with system software
    Endless loop (abandoned only in an emergency):
    DSP node loop:
Retrieving events of the latest computation—in case they are available—from the buffer memory;

Transmitting the radar data in the DSP memory;
Starting the computation;
  End of the DSP node loop,
  End of the endless loop,
Release of the resources of the DSP system.

Furthermore, for integration purposes, time measurement (as well as the ability to transmit and display status reports of the individual DSP nodes) is integrated into the minimum required system software.

Therefore, it must be taken into consideration that the simulation of the source and the terminal via a single program can under certain conditions, falsify the measurement results. To prevent this, the source and the terminal can also be simulated via programs running separately and independently from each other. However, the influence of the operating system Windows NT should be taken into account, which in turn can also have a falsifying effect. In the real operation, however, these problems do not occur, since at least the data source is realized as a separate bus subscriber because of the high incoming data rates.

The system software of the DSP nodes is essentially simpler in its structure since the transfer of radar data, as well as the entire sequence control, is executed by the host. It was created in the code composer with ANSI-C (American National Standards Institute) and auxiliary functions of the Daytona C6x DSP Software Development Kit of Spectrum according to Daytona Dual 'C6x PCI Board—Technical Reference, Doc. No.500-00383, Rev. 2.00, Spectrum Signal Processing Inc., May 1999, and converted to an executable code with the code generation tools of Texas Instruments.

The following actions are carried out by the software:
Initialization of the DSP hardware
  Endless loop;
Waiting for new radar data;
Executing signal processing algorithms;
Transmitting result data to the host;
  End of endless loop.

Here also, for integration purposes, another time measurement as well as the ability to transmit DSP status reports, was integrated into the minimum required system software.

It was shown to be problematic to divide the available memory accessible to the host so that input and output data can be maintained simultaneously (that is, in different memory areas). On the one hand, this makes possible an almost simultaneous transfer to and from the DSP nodes, the coordination taking over therein the arbitration mechanism of the PCI bus; on the other hand, the number of memory accesses of the DSP software cannot be allowed to increase excessively by additional copying actions.

To be able to evaluate the effectiveness of the DSP system, the required computation time was determined at two locations to prevent measurement errors. The computation time for a single burst was measured in the DSP software and a similar measurement took place in the host software. The latter value contained in addition the data transfer times and was therefore somewhat higher.

The duration of one burst served as comparison scale for the measured values. The quotient of both values produces a first approximation of the required number of DSPs for the realization of the corresponding algorithm combination.

The representation of the effectiveness of the system designed according to the invention was tested, on the configuration of the MTI (Moving Target Indicator) ModKit, and also on other configurations of part realistic, part academic nature. The following table shows in detail the algorithm combinations, the required computation times, as well as the number of TMS320C6701 required for the real-time realization:

| Configuration | Algorithmic | Computation Times | Number of DSPs |
|---|---|---|---|
| Original condition | 2 complex filters<br>OS-CFAR<br>2544 EZ<br>GCM-resolution 180 | 90/95 ms | 3 |
| Simplified | 2 real filters<br>CA-CFAR<br>2544 EZ<br>CGM resolution 180 | 31/36 ms | 1 |
| Minimum system | 2 real filters<br>CA-CFAR<br>1000 EZ<br>GCM resolution 180 | 12/17 ms | 1 |
| Efficiently simplified | 2 real filters<br>CAGO-CFAR<br>1000 EZ<br>GCM resolution 180 | 13/18 ms | 1 |
| System A | 8 complex filters<br>CAGO-CFAR<br>1000 EZ<br>GCM resolution 180 | 76/82 ms | 2 |
| Complex system A | 8 complex filters<br>OS-CFAR<br>1000 EZ<br>GCM resolution 512 | 137/143 ms | 4 |

Remarks with respect to the table:
  EZ: distance cells
  The Ground Clutter Map (GCM) resolution "512" contains the mean value formation of neighboring GCM entries
  The use of the reduced number of distance cells is allowed because of the 2.5-fold oversampling.

Abbreviations and Terms
ANSI—American National Standards Institute
CFAR—Constant False Alarm Rate
COTS—Commercial Off-the-Shelf
CPCI—Compact PCI
DSP—Digital Signal Processor
GCM—Ground Clutter Map
IV—Information Processing
MTI—Moving Target Indicator
MTD—Moving Target Detector
PCI—Peripheral Components Interconnect
PMC—PCI Mezzanine Connector The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A scalable radar signal processing system for processing data transmitted between a data source and a receiving terminal, said signal processing system comprising:
  a data bus system having a plurality of digital signal processor nodes;
  a corresponding plurality of standard digital signal processor cards connected in parallel via said data bus system; and
  components for user data delivery and for user data collection connected to said bus system; wherein
  each digital signal processor node is operated with software which is the same as software operated by remaining digital signal processor nodes; and all signal processing algorithms are executed on a user data component assigned to corresponding nodes.

2. The radar signal processing system according to claim 1, wherein a local bus system is used.

3. The radar signal processing system according to claim 2, wherein:

the user data are distributed in packages, each package including a portion of the overall user data; and the packages are transmitted in sequence to the digital signal processors and are forwarded from the digital signal processors after processing.

4. The radar signal processing system according to claim 3, wherein a processing cycle consists of the following steps:

transmission of a data package from the data source to the digital signal processor node;

setting of an input status word;

calculation of result data;

setting an output data word; and transmitting the result data to the receiving terminal.

5. The radar signal processing system according to claim 3, wherein the signal processing system is integrated into a personal computer, which carries out simultaneously simulation of the data source and the receiving terminal, as well as measurement of values for optimization purposes.

* * * * *